US 6,717,310 B2

(12) United States Patent
Yoshikawa et al.

(10) Patent No.: US 6,717,310 B2
(45) Date of Patent: Apr. 6, 2004

(54) SPINDLE MOTOR AND METHOD FOR ASSEMBLING THE SAME

(75) Inventors: Shoichi Yoshikawa, Tottori (JP); Takao Yoshitsugu, Tottori (JP); Norimasa Takata, Tottori (JP)

(73) Assignee: Matsushita Electric Industrial Co., Ltd, Osaka (JP)

(*) Notice: Subject to any disclaimer, the term of this patent is extended or adjusted under 35 U.S.C. 154(b) by 0 days.

(21) Appl. No.: 10/152,820

(22) Filed: May 23, 2002

(65) Prior Publication Data
US 2002/0185925 A1 Dec. 12, 2002

(30) Foreign Application Priority Data
Jun. 8, 2001 (JP) ......................................... 2001-173672

(51) Int. Cl.$^7$ ................................................. H02K 7/08
(52) U.S. Cl. ........................ 310/90; 310/67 R; 384/107
(58) Field of Search ................................ 310/90, 67 R; 384/107, 112, 121, 100

(56) References Cited

U.S. PATENT DOCUMENTS

| 6,005,312 A | * | 12/1999 | Yamane | 310/67 R |
| 6,097,121 A | * | 8/2000 | Oku | 310/91 |
| 6,211,592 B1 | * | 4/2001 | Ichiyama | 310/90 |
| 6,339,270 B1 | * | 1/2002 | Ichiyama | 310/67 R |
| 6,343,877 B1 | * | 2/2002 | Miura et al. | 384/100 |
| 6,375,357 B2 | * | 4/2002 | Miura et al. | 384/100 |

FOREIGN PATENT DOCUMENTS

| JP | 05161328 | 6/1993 | 310/40 MM |
| JP | 11-187611 | 7/1999 | H02K/7/08 |
| JP | 11280755 | 10/1999 | H02K/7/08 |
| JP | 2000050567 | 2/2000 | H02K/7/08 |
| JP | 2000-201459 | * 7/2000 | H02K/5/16 |
| JP | 2000274428 | 10/2000 | H02K/7/08 |
| JP | 200324753 | 11/2000 | H02K/7/08 |

* cited by examiner

Primary Examiner—Burton S. Mullins
Assistant Examiner—Yahveh Comas
(74) Attorney, Agent, or Firm—Wenderoth, Lind & Ponack L.L.P.

(57) ABSTRACT

A downsized spindle motor having a longer bearing service life and enhanced shock resistance includes a flange 11, which bears an axial load of a shaft 8, and which is fixed to an end of shaft 8. Laser welded section 14 is provided at the fixed section between shaft 8 and flange 11. Rotor hub 50 is fixed to another end of shaft 8, and laser welded section 54 firmly bonds the two elements.

20 Claims, 4 Drawing Sheets

SPINDLE MOTOR AND METHOD FOR ASSEMBLING THE SAME

FIELD OF THE INVENTION

The present invention relates to a spindle motor to be mounted to, for instance, a hard disc drive, an optical disk drive, a magneto-optical disc drive, a magnetic disc drive and a polygon mirror. More particularly, it relates to a fluid bearing of the spindle motor and a method of assembling the bearing.

BACKGROUND OF THE INVENTION

Recently, an HDD device similar devices to which a spindle motor is mounted have been downsized conveniently for hand carrying. However, a user will sometimes happen to drop the device carelessly or hit the device against another device by mistake due to the smaller size, the lighter weight, or due to hand carrying.

Various kinds of spindle motors are available in the market, and thus a major component of the spindle motor (i.e., a fluid bearing device) has a number of forms. Many of the fluid bearing devices include a cylindrical sleeve, which bears the load of a shaft in a radial direction. The sleeve surrounds the shaft via an annular space between an outer wall of the shaft and an inner wall of the sleeve. This space is called "a radial bearing space" and is filled with lubricant such as oil. When a rotor-hub fixedly mounted to a first end of the shaft rotates, hydrodynamic-pressure-generating grooves (e.g. herringbone grooves) generate dynamic pressure in the lubricant, so that a radial bearing is formed. The grooves are provided on the outer wall of the shaft and the inner wall of the sleeve.

A disc-shaped thrust plate is fixed to a second end of the shaft, and herringbone grooves, for instance, are provided on at least one of an upper face or a lower face of the thrust plate. Lubricant is filled into the grooves, so that a thrust bearing is formed in order to bear a load in an axial direction.

A conventional brush-less motor having a fluid bearing is disclosed in Japanese Patent Application Non-Examined Publication No. 2000-50567 (hereinafter referred to as "prior art 1"), and this motor features excellent shock resistance. Another Japanese Patent Application Non-Examined Publication No. H11-280755 (prior art 2) discloses a spindle motor featuring improved abrasion resistance as well as shock resistance. Still another Non-Examined Publication No. 2000-274428 (prior art 3) discloses a spindle motor which includes a fluid bearing having a shaft member with a flange. This flange is formed by press-fitting a ring member to be used in dynamic pressure into a cylindrical member. This prior art 3 publication also discloses a method of assembling the spindle motor. Another Non-Examined Publication No. H05-161382 (prior art 4) discloses a disc driving device which prevents the accuracy of whirling of a pulley or a rotor yoke from lowering. The pulley or the rotor yoke positions and retains a disc. To achieve this advantage, a projection is formed on a rear side of the rotor yoke at a vicinity of an inner rim. The projection closely faces an end face of a bearing for a rotary shaft. The rotor yoke is spot-welded to the rotary shaft or welded by laser at a vicinity of the inner rim of the front surface.

Prior art 1 teaches that a flange is arranged on a sleeve on its rotor hub side, and a pull-stopper fixed to the rotor hub is brought into contact with the flange when the rotor hub moves along the shaft. These mechanics thus require a complicated structure. Prior art 2 teaches that a thrust plate is fixed to an end of a sleeve by caulking, thereby forming a sleeve having a bottom made from the thrust plate in order to increase shock resistance. The caulked section is sealed with adhesive. Therefore, prior art 2 does not teach anything about a flange to be fixed to a shaft. Prior art 3 teaches that the cylindrical member (i.e., a shaft of the spindle motor) and the ring member are machined independently, then the cylindrical member is press-fitted into the ring member to form an integrated shaft structure. However, the press-fitting invites scratches on the ring member and the shaft, and it must be admitted that this structure has a limited mechanical strength. Instead of machining the shaft and flange independently, a structure unitarily formed with a shaft and a flange and having a cross-shaped sectional view would overcome the problem discussed above. However, this shaft would boost the production cost, and it would be difficult to obtain satisfactory accuracy of a shaft diameter. It is extremely difficult to provide grooves for producing dynamic pressure on the shaft section and the flange section of the structure having a cross-shaped sectional view. This will lower the productivity and boost the production cost. Prior art 4 teaches that the surface of a pulley is spot-welded or laser-welded to the shaft at the vicinity of the inner rim. However, prior art 4 does not disclose anything about the structure of the spindle motor or how to improve the mechanical strength between the shaft and the disc-shaped flange to be fixed to the shaft. Thus, improvement of the shaft's service life and shock resistance of the spindle motor cannot be expected.

SUMMARY OF THE INVENTION

The object of the present invention is to provide a spindle motor including the following elements: a shaft; a disc-shaped flange fixedly mounted to a first end of the shaft and having a diameter greater than that of the shaft; a cylindrical sleeve to be fit to the shaft; a radial bearing space formed between an outer wall of the shaft and an inner wall of the sleeve closely facing the outer wall of the shaft; a rotor hub fixed to a second end of the shaft and facing an upper end of the sleeve; a thrust plate closely facing the flange; a thrust bearing space formed between the faces, closely facing each other, of the flange and the thrust plate; and lubricant retained in the thrust bearing space. The disc-shaped flange has a hollow section around its center in which the shaft is fit, and the second end of the shaft is inserted into the hollow section such that the shaft is stopped while being inserted into the hollow section. As a result, a recess is formed in the hollow section. This insertion stopping of the shaft in the hollow section does not stuff up the hollow section, but leaves the recess therein. This recess is useful for recognizing a welding section between the shaft and the flange.

The recess left in the hollow section can be used as a place to be welded (i.e., a margin for applying the welding). Laser can be irradiated to the inner wall of the hollow section using this recess, so that a welding section of the flange can be within a thickness of the flange. A bending moment caused by shrinkage stress due to melting/hardening becomes so small that the flange is not deformed into a dish-shape, and the flange thus keeps its flatness and vertical status excellent. As a result, the motor features a long-life shaft. The recess in the hollow section can also work as a reservoir of lubricant. This reservoir has a sufficient room for the lubricant and is located near the thrust bearing space, so that the shaft can enjoy a longer service life. A wall of the reservoir can be made seamless by laser welding, so that the reservoir is kept highly airtight. Therefore, if a spiral groove, where a center reservoir receives the highest pressure, is formed and the thrust bearing space having a uniform width is prepared, a high load bearing capability can be expected. As a result, the shaft can enjoy a longer service life.

A spindle motor of the present invention comprises the following elements: a shaft, a disc-shaped flange fixedly mounted to a first end of the shaft and having a diameter greater than that of the shaft; a cylindrical sleeve to be fit to the shaft; a radial bearing space formed between an outer wall of the shaft and an inner wall of the sleeve closely facing the outer wall of the shaft; a rotor hub fixed to a second end of the shaft and facing an upper end of the sleeve; a thrust plate closely facing the flange a thrust bearing space formed between the faces, closely facing each other, of the flange and the thrust plate; and lubricant retained in the thrust bearing space. The shaft includes a larger diameter section and a smaller diameter section at a first axial end which forms a projection, and the flange includes a hollow section at a vicinity of a center thereof. The smaller diameter section of the projection is fit to the hollow section. The hollow section has a smaller diameter instead of a greater diameter which would be needed to receive the greater diameter section of the shaft. This smaller diameter restrains the flange from reducing its active area, and the capability of the thrust bearing is not lowered. As a result, the thrust bearing can bear a large load, and the shaft has a longer life. The radius of the flange is greater than the thickness of the flange. Thus, when an inner wall of the hollow section is welded by laser, the flange exerts a great resistance against deformation due to shrinkage stress, thereby minimizing the deformation. As a result, the motor enjoys a longer shaft life.

A method of assembling the spindle motor of the present invention comprises the following steps: preparing a shaft; bringing a first disc-shaped unit into contact with the shaft, the first disc-shaped unit being a part of a thrust bearing for bearing an axial load of the shaft, and fixing the disc-shaped unit to the shaft; welding the contacting face between the disc-shaped unit and the shaft by laser; fitting the shaft to a cylindrical sleeve; and facing a second disc-shaped unit, which forms the thrust bearing, closely to the first disc-shaped unit. According to this method, almost all of the contacting face between the shaft and the first disc-shaped unit is welded by laser, so that the fixing strength between the shaft and the first disc-shaped unit, e.g., a flange, can be enhanced. As a result, the spindle motor features stronger shock resistance.

Another method of assembling the spindle motor includes: fixing a flange to a first axial end of a shaft, the flange having a greater diameter than the shaft; inserting the second axial end of the shaft into a cylindrical and open-ended sleeve, thereby extending the second axial end from the second end of the sleeve; facing a first face of the flange closely to a first face of a thrust plate; and fixing the thrust plate to a part of the first end of the sleeve, thereby sealing the first end of the open-ended sleeve. According to this method, a unitized component of the spindle motor can be assembled, so that the shaft, flange, thrust plate and sleeve are integrated into one unit. As a result, a complicated assembly process is simplified using this unitized component. When the flange is fixed to the end of the shaft, the thrust plate, which jointly forms the thrust bearing with the flange, can be fixed with ease. Since the open-ended sleeve is used, the shaft with the flange can be fit to the sleeve with ease.

DETAILED DESCRIPTION OF THE INVENTION

EMBODIMENT 1

Figure 1:
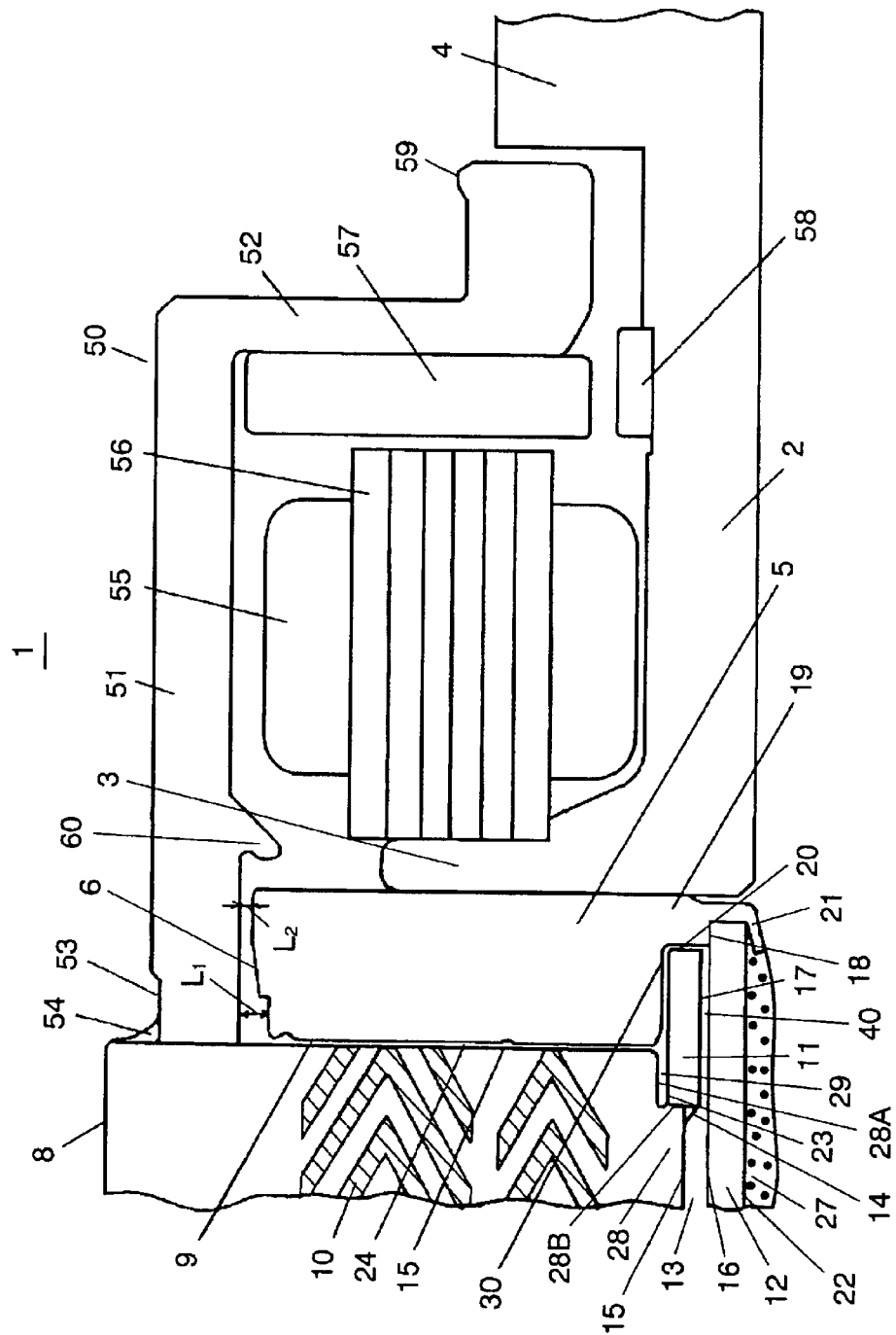
FIG. 1 is a sectional view of half of an essential part of a spindle motor in accordance with a first exemplary embodiment of the present invention, in which the spindle motor is substantially symmetrical about the longitudinal axis of the shaft.
Figure 2:
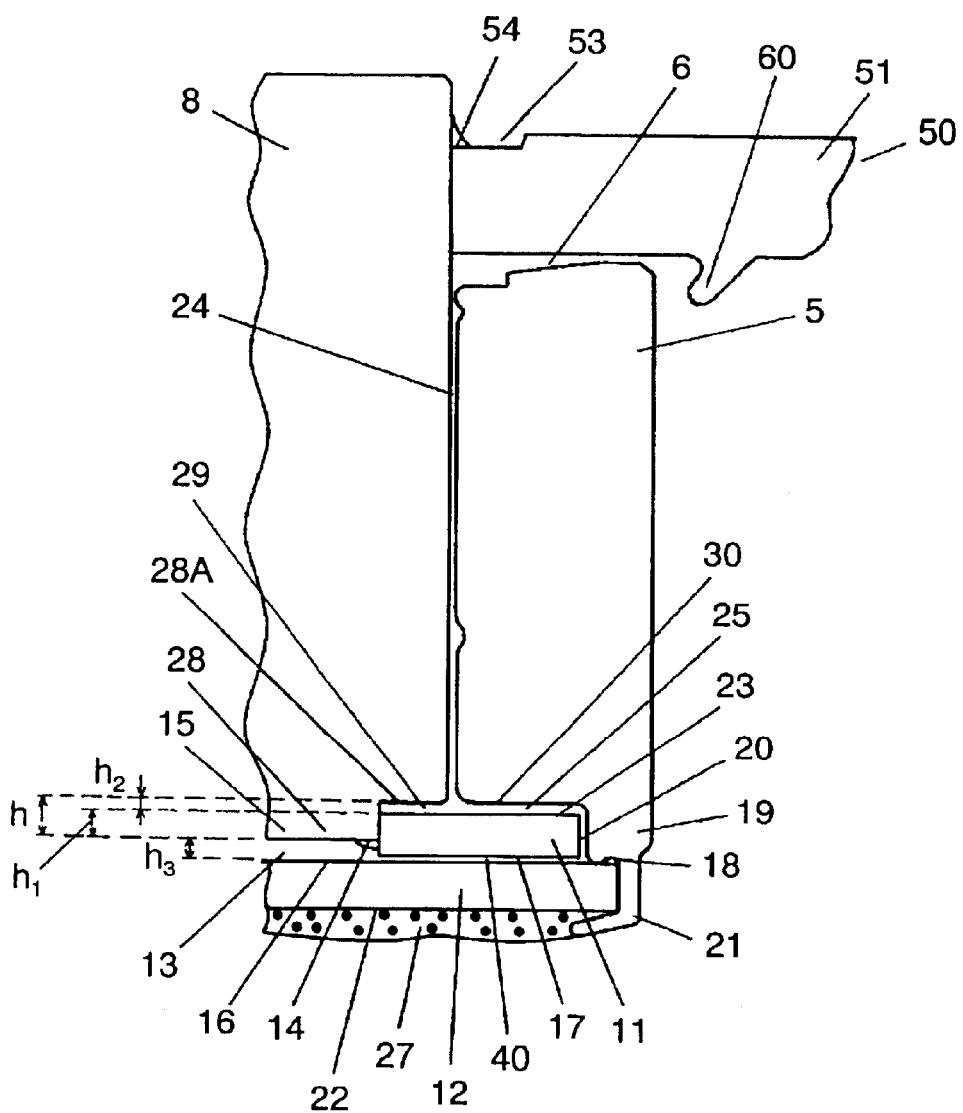
FIG. 2 is an enlarged view of a part of the spindle motor shown in FIG. 1.

FIG. 1 and FIG. 2 are sectional views of an essential part of a spindle motor in accordance with the first exemplary embodiment of the present invention. Spindle motor 1 includes inner cylinder 3 and outer cylinder 4 respectively arranged on an inner wall and an outer wall of base member 2, which is made of, for example, die-cast aluminum. Sleeve 5 is arranged on an inner wall of inner cylinder 3. Sleeve 5 is shaped substantially as a cylinder, and is made of brass plated with nickel. Tapered section 6 is located at an upper first end of sleeve 5, and the upper end surrounds an opening of sleeve 5 and faces a lower face of shoulder 51 of rotor hub 50 which is mounted to shaft 8. A lower (second) end of sleeve 5 (i.e., an end opposite to the opening) is initially open in a first stage, but is sealed after the motor is assembled. In other words, cylindrical sleeve 5 is initially an open-ended sleeve in which both ends are open on in the first stage. Adhesive is applied to an outer wall of sleeve 5, which is then inserted and fixed to inner cylinder 3 of base member 2.

At least one of the outer wall of shaft 8 or the inner wall of sleeve 9 has grooves, for example, herringbone grooves 10. In this first embodiment, herringbone grooves 10 are provided on the outer wall of shaft 8. The outer face of shaft 8, on which herringbone grooves 10 are formed, and a corresponding inner face of sleeve 5 form a radial bearing space 24, which is a part of a radial bearing. Herringbone grooves 10 are filled with a lubricant, such as oil. Grooves 10 with the lubricant work as a fluid bearing and generate dynamic pressure in the radial direction when shaft 8 spins.

On a part of the outer wall of shaft 8, flange 11 is fixed by laser welding. The place where flange 11 is welded can be determined depending on the design of the spindle motor. For instance, as disclosed in prior art 3 (Publication No. 2000-274428), the place may be approximately at the center of a shaft. In this embodiment, projection 28 is provided at a second end of shaft 8, and flange 11 is fixed to projection 28, because a structure including thrust plate 12, which is described later, is taken into consideration. Flange 11 is a disc-shaped metal component. For example flange 11 can be shaped as a ring with a hollow section at its center, and can be made from stainless steel SUS420J2. Since shaft 8 and flange 11 are independent of each other, they can be made of different materials. Thus, various combinations of size, shape, or material are available for the structure of a shaft with a flange as long as the shape and flange are independent of each other. In other words, shaft 8 and flange 11 can be made from either metal or non-metal, or they can be made of different material from each other.

In the present invention, flange 11 has an outer diameter greater than the outer diameter of shaft 8, and is a ring-shaped metal unit, in which the center part is hollowed out.

First face 17 of flange 11 closely faces first face 16 of thrust plate 12. At least one of face 16 or face 17 has grooves, for example, herringbone grooves (not shown), thereby forming a thrust bearing which bears an axial load of shaft 8. In this specification, when it is not necessary to distinguish the radial bearing space from the thrust bearing space, a general expression of "bearing space" is used.

The shape of shaft 8 can be a substantially uniformly cylindrical in an axial direction, or the shape of shaft 8 can include a non-flat section which is machined to form a projection or a recess, for example the shape shaft can have a greater diameter section and a smaller diameter section). The shape of flange 11 can include a non-flat section corresponding to that of shaft 8, so that the flange 11 and shaft 8 fit together. In other words, the flange 11 has a projection, a recess or a hollow section 13, so that flange 11 can be fit to the second end of shaft 8 with ease. Thus the two non-flat sections engage with each other, thereby firmly fixing the two elements to each other.

In the first embodiment illustrated in FIG. 1 and FIG. 2, projection 28 is provided to at a second axial end of shaft 8, and hollow section 13 is provided at the non-flat (center) section of flange 11. FIG. 1 and FIG. 2 are sectional views of an essential part of the spindle motor in accordance with the first exemplary embodiment of the present invention. In those drawings, a left side of shaft 8 is omitted, because the spindle motor is substantially symmetric with respect to shaft 8.

One of the advantages of the spindle motor of the present invention is that shaft 8 has projection 28, which provides shaft 8 with a larger diameter section and a smaller diameter section. Projection 28 having the smaller diameter is inserted into hollow section 13 of flange 11, and a contact section between flange 11 and projection 28 is welded by a laser, so that laser-welded section 14 is formed. When projection 28 is inserted into hollow section 13, side surface 28B (an outer wall of the smaller diameter section) of projection 28 comes into contact with an inner wall of hollow section 13. Shoulder 28A of projection 28 (i.e., an end face of the larger) diameter section excluding the smaller diameter section closely facing second face 23 of flange 11.

Shoulder 28A of projection 28 is defined as the end face of the greater diameter section at a boundary between the greater diameter section and the smaller diameter section. Shoulder 28A closely faces second face 23 of flange 11, and shoulder 28A has an area of equal to a circular area of the smaller diameter section subtracted from the circular area of the greater diameter section. Side surface 28B of projection 28 is defined as the outer wall of the smaller diameter section. A sectional view of shoulder 28A connected to side surface 28B has an "L" shape. The contact face to the flange along this "L" shape is welded by laser, so that the bonding strength therebetween is enhanced.

Shaft 8 and flange 11 preferably intersect each other at a angle, and are fixed to each other at highly accurate positioning. If flange 11 is fixed to shaft 8 so as to be slanted (not at a right angle), a load bearing area of a thrust-directing-face becomes smaller, thereby lowering the capability of the thrust bearing. In an HDD apparatus, in order to maintain the reliability of recording/reproducing, an axial height of a media with respect to a magnetic head is preferably positioned at a high accuracy. Therefore, shaft 8 and other components are assembled with a high accuracy with respect to flange 11 which is a part of the thrust bearing.

The vertical status and slant (these are referred to as run-out or whirling) of flange 11 with respect to shaft 8 are critical factors for determining the performance and the service life of the spindle motor. Therefore, before and after the laser welding, not to mention during the welding, the positioning of shaft 8 and flange 11 is preferably monitored, so that the performance and life of the spindle motor can be further enhanced. When the laser welding is carried out intermittently by changing or adjusting its conditions, the whirling of flange 11 with respect to shaft 8 can be substantially restrained. After the welding, at least one of welded section 14 or flange 11 is preferably ground (machined) with reference to the diameter of shaft 8, thereby restraining the whirling to within a given range. The acceptable range of the whirling is not more than several $\mu$m, and preferably not more than 2 $\mu$m. The laser welding and grinding are accomplished to satisfy this range. The place to be welded or its vicinity can be ground prior to the laser welding.

Space 25 is formed between shoulder 30 of sleeve S and second face 23 of flange 11. A lubricant such as oil runs through space 25 into thrust bearing space (40 i.e., between first face 17 of flange 11 and first face 16 of thrust plate 12).

As a result, the distance between end face 15 of shaft 8 and first face 16 of thrust plate 12 is greater than the distance between first face 17 of flange 11 and first face 16 of thrust plate 12 as illustrated in FIG. 1 and FIG. 2. End face 15 of projection 28 can be carefully inserted into hollow section 13 so as not to hit face 16 of thrust plate 12 (i.e., projection 28 is stopped during insertion in hollow section 13. Therefore, hollow section 13 is not completely stuffed (filled) up, and some portion remains as a hollow section.

When shaft 8 is inserted into hollow section 13 located at the approximate center of flange 11, a recess is formed in hollow section 13. This recess can be used as a recognizing section to define laser-welding section 14. Hollow section 13 provides a margin for applying the weld as well as a vacant space for receiving the lubricant. The spindle motor can thus be downsized.

Grinding the flange has been previously described. However, it is desirable to obtain an excellent whirling characteristic without grinding the flange. In this embodiment, several novel techniques are introduced to achieve this goal. First, shaft 8 is inserted into hollow section 13 of flange 11, but shaft 8 is stopped on the way through, thereby forming a recess in flange 11. Then laser welding section 14 is provided at the recess. In other words, laser welding section 14 is provided within a thickness range of flange 11, preferably around the middle of the thickness. As such, the shrinkage stress of flange 11 becomes uniform in the thicknesswise direction, so that warpage of flange 11 can be prevented. Next, an interference of not more than 20 $\mu$m is desirable between shaft 8 and flange 11, and more preferably a tolerance of the interference fit is as small as not more than 10 $\mu$m. This value can minimize deformation of flange 11 due to a stress produced by a temporary insertion of shaft 8 into flange 11. At the same time, the laser welding is completed with shaft 8 temporarily retained in flange 11 to maintain excellent whirling characteristics. In the welding step, the laser beam evenly irradiates two points on a diagonal line, and the center axis of shaft 8 is on the line in the middle of the two points, or evenly irradiates multi-points on a circle multi-equi-divided. This laser beam irradiation makes the shrinkage stress work evenly in a circular direction, so that it prevents flange 11 from becoming slanted (at a non-right angle) with respect to shaft 8.

Thrust plate 12 and flange 11 work together to form the thrust bearing which bears the axial load of shaft 8. As shown in FIG. 1 and FIG. 2, these two elements can also be used as a sealing member and an outer member of a so called "one-side sealed spindle motor". This utilization of the two elements can simplify the motor structure.

Disc-shaped flange 11 of the present invention has a greater outer diameter than shaft 8, and is integrated into shaft 8, thereby forming a shaft structure. Flange 11 bears the axial load of shaft 8, and prevents shaft 8 from moving in the axial direction. In other words, flange 11 is one of the members forming the thrust bearing. Flange 11 thus works as a thrust plate. Thrust plate 12 of the present invention is originally one of the members forming the thrust bearing. However major functions of the thrust bearing are done by flange 11. As a result, thrust plate 12 can work as the sealing member and the outer member. In other words, the names "flange" and "thrust plate" used in this specification do not specify or limit the operations or functions of the components in spindle motor 1, and, "flange" and "thrust plate" are compatible with each other in this technical field, or different names can be used for these components. In this specification, both of the flange and the thrust plate are disc-shaped members and form the thrust bearing, thus so they can alternatively be called a first disc-shaped unit and a second disc-shaped unit.

Peripheral section 18 is provided at the outer circumference of disc-shaped thrust plate 12. At peripheral section 18, flange 11 does not closely face thrust plate 12. This structure is also one of the advantages of the present invention. A diameter of thrust plate 12 is set greater than the outer diameter of flange 11, so that peripheral section 18 can be formed. Peripheral section 18 is useful for arm section 19 of sleeve 5 to closely face side wall 20 of flange 11 as well as face 16 of thrust plate 12. This structure allows sleeve 5 to firmly surround flange 11, and allows sleeve 5 to firmly hold thrust plate 12. The sleeve 5 has a tip section 21 extending from arm section 19, and the tip section 21 is bent radially inward toward the second face 22 (i.e., a rear face) of thrust plate 12 and then caulked. The caulked section is fixed by applying adhesive, thereby further increasing mechanical strength such as shock resistance.

On the first axial end of shaft 8 (i.e., the end having a larger diameter), the rotor hub 50 is fixed. Hub 50 comprises a disc-shaped shoulder 51 and an arm 52 extending axially from an outer rim of shoulder 51. Oil fence 60 is provided at a part of shoulder 51. Oil fence 60 prevents the lubricant from splashing out from sleeve 5. A dint 53 of approximately 0.1 mm depth is provided around the place where shaft 8 is mounted. Laser welding is applied to a contact spot between shaft 8 and dint 53, thereby forming a second laser welded section 54.

Cup-shaped section 59 is provided on arm 52, and cup-shaped section 59 can fixedly hold a disc or the like (not shown). On an inner wall of arm 52, cylindrical magnet 57, which is magnetized N pole and S pole alternately, is fixed.

Stator core 56 wound with coil 55 is mounted, close to magnet 57, on a part of base member 2. Attracting plate 58 is positioned on another part of base member 2, so that the plate 58 faces the magnet 57. Attracting plate 58 is made of material having little iron loss, such as iron-nickel alloy, and magnet 57 and attracting plate 58 magnetically attract each other. Therefore, even if the spindle motor is used at any angle, the elements of the spindle motor are always retained in their normal places. In other words, sleeve 5, thrust plate 12, stator core 56, shaft 8, rotor hub 50 and the like can be firmly retained at predetermined locations.

When coil 55 is powered, a magnetic field is produced at a salient pole of stator core 56, and torque is generated between stator core 56 and magnet 57 facing stator 56, thereby rotating rotor hub 50. A media (not shown) clamped to rotor hub 50 thus spins. The rotation of hub 50 causes shaft 8 (fixed to hub 50) and flange 11 (fixed to shaft 8) to spin. This mechanism allows the lubricant and the herringbone grooves to produce dynamic pressure, so that spindle motor 1 works.

EMBODIMENT 2

FIG. 2 is an enlarged view of a part of the spindle motor shown in FIG. 1, and is particularly a detailed view of the fitting status between shaft 8 and sleeve 5, and an enlarged view of the end of shaft 8. Herringbone grooves 10 shown in FIG. 1 are omitted in order to simplify FIG. 2. The elements similar to those in FIG. 1 have the same reference numbers.

Shaft 8 can be a substantially uniform cylinder in the axial direction. However, in this second embodiment, shaft 8 having two sections is used. To be more specific, the shaft 8 has a first section with a larger diameter and has a second section (i.e., projection 28), with a smaller diameter. Disc-shaped metallic flange 11 having hollow section 13 is used. Projection 28 of shaft 8 is fit into hollow section 13 of flange 11 such that some portion of hollow section 13 still remains between thrust plate 12 and end face 15 of shaft 8. Thickness "t" of flange 11 is at least equal to height "h" (represented by side 28B) of projection 28 (the smaller diameter section). Thus, the height "h" and thickness "t" have the relationship, $h \leq t$. This relation can form hollow section 13 between projection 28 and thrust plate 12, and form lubrication reservoir 29 between projection 28 and flange 11. The importance of this relation can be clarified by assuming a relation of $h > t$, which is in inverse relation to $h \leq t$. If the relation of $h > t$ were established, end face 15 of projection 28 would hit first face 16 of thrust plate 12. Alternatively, if shaft 8 is carefully inserted into hollow section 13 of flange 11 so as not to hit first face 16, lubrication reservoir 29 becomes unnecessarily large and tends to trap bubbles. Reservoir 29, which is the space formed between shoulder 28A and second face 23 of flange 11, does not work well as a lubricant reservoir. Shock resistance also lowers because the space becomes larger.

In the second embodiment, the dimensions of the critical elements are as follows:

height of projection 28:h=0.35 mm;

thickness of flange 11:t=0.50 mm; and a fitted depth of projection 28 into hollow section 13:h1=0.25 mm. According to these dimensions, the height of reservoir 29 is h2=(h−h1), and the height of hollow section 13 is h3=(t−h1). In this embodiment, the height of reservoir 29:h2=0.10 mm, or 100 $\mu$m, and the height of hollow section 13:h3=0.25 mm, or 250 $\mu$m. In the spindle motor of the present invention, the height "h" of projection 28 (i.e., the height of side 28B), the thickness "t" of flange 11, and the fitted depth "h1" of the smaller diameter section to flange 11 are predetermined, then the height "h2" of reservoir 29 and the height "h3" of hollow section 13 can be determined at given sizes.

Reservoir 29 can be formed by arranging shaft 8, sleeve 5 and flange 11, namely, these three elements are respectively shaped in predetermined forms and located such that the three elements closely face each other, so that three spaces are created. One of the spaces is closed by applying laser welding, so that reservoir 29 is created. In other words, the lubricant supplied via radial bearing space 24, which is formed between the shaft 8 and the sleeve 5, runs into second face 23 of flange 11 and branches into space 25 and reservoir 29. One of the branches is stopped by laser welded section 14 to form reservoir 29. Reservoir 29 sealed by laser welded section 14 is tightly closed, so that the lubricant hardly leaks out, and the mechanical strength of reservoir 29 increases.

Space 25 leads the lubricant into thrust bearing space 40 formed between first face 17 of flange 11 and first face 16 of thrust plate 12, and works as the radial bearing space as well as the thrust bearing space. The size of space 25 can be arbitrarily determined based on the height and shape of shoulder 30 of sleeve 5. Shoulder 30 of sleeve 5 shown in FIG. 2 is set such that a height of shoulder 30 is substantially the same as a height of shoulder 28A of projection 28. However, the two shoulders can form a step, and the sizes of space 25 and reservoir 29 can be determined independently. Reservoir 29 is also not necessarily provided between shoulder 28A of projection 28 and second face 23 of flange 11, and those two faces closely opposite to each other may be welded by laser entirely or partially. This welding reduces an active length as well as an active area of the bearing space, although the fixing strength between shaft 8 and flange 11 is enhanced.

The structure discussed above is namely to provide a T-shaped space on second face 23 of flange 11. The vertical line of the T-shape corresponds to radial bearing space 24, and the horizontal bar of the T-shape corresponds to a space-path including space 25 and reservoir 29 communicating with each other. This structure of the T-shaped space is good for an intermediate space supplying the lubricant to thrust bearing space 40, or good for forming a lubricant reservoir.

Hollow section 13 is surrounded by end face 15 of projection 28, flange 11, and first face 16 of thrust plate 12, and also works as a lubricant reservoir. Laser welded section 14 is provided on a contact face between end face 15 and a side wall of flange 11. This laser welding section 14 firmly fixes shaft 8 to flange 11, and serves as a wall of the reservoir of hollow section 13. Laser welded section 14 also works as a wall of reservoir 29. In other words, laser welded section 14 works as the wall of reservoir 29 as well as the wall of hollow section 13 at the same time.

Remaining hollow section 13 is useful for adjusting an overall height of spindle motor 1, and effective for absorbing the dispersion due to manufacturing shaft 8.

EMBODIMENT 3

Figure 3:
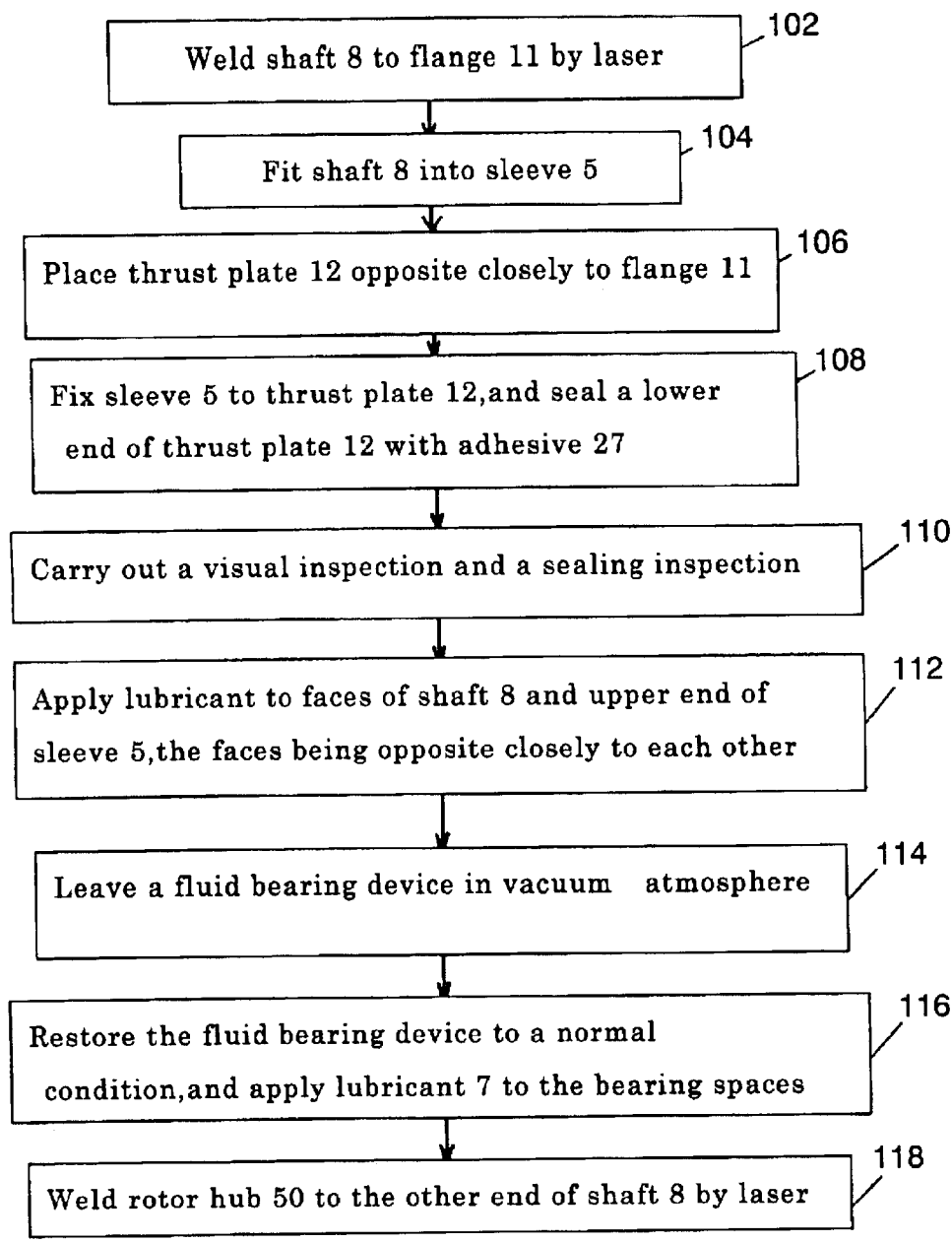
FIG. 3 is a flowchart illustrating the steps of assembling the spindle motor in accordance with the first exemplary embodiment.

FIG. 3 is a flowchart illustrating the steps of assembling the spindle motor in accordance with the first embodiment. The steps are described with reference to FIG. 1 and FIG. 2. According to method 100 of assembling spindle motor 1 of the present invention, flange 11 is fixed to a second end of shaft 8 by laser welding, as shown in step 102, so that flange 11 is integrated into shaft 8. Flange 11 has a diameter larger than shaft 8. Places to be welded by laser are contact sections between shaft 8 and flange such as the shoulder 28A and the side 28B of shaft 8. In particular, both of the sections can be welded, or either one, or parts of them can be selectively welded.

Step 104 shows that shaft 8 is fit into sleeve 5. A first end of shaft 8 is inserted into sleeve 5, the first end being the end other than the second end where flange 11 is fixed, so that shaft 8 is fit to sleeve 5. The first end of shaft 8 extends from sleeve 5, and rotor hub 50 described later is fixedly mounted to parts of the extended section. Sleeve 5 is cylindrical and both of its ends are open, i.e., sleeve 5 is an open-ended type of sleeve. Shaft 8 is inserted from a lower end of sleeve shown in FIG. 1 and FIG. 2, and fixed to flange 11. An outer wall of shaft 8 faces inner wall 9 of sleeve 11 via a fine annular space. The outer wall of shaft 8 refers to the outer circumferential face of the larger diameter section of shaft 8. The fine annular space has a width of several $\mu$m, and forms radial bearing space 24 which bears an axial load of shaft 8.

Step 106 shows that disc-shaped thrust plate 12 is positioned to closely face flange 11. First face 16 of thrust plate 12 is closely placed opposite to first face 17 of flange 11. These two faces, facing each other, form a thrust bearing which bears an axial load of shaft 8. Because thrust plate 12 has a larger diameter than that of flange 11, peripheral section 18 is formed on plate 12, and peripheral section 18 does not face flange 11.

Step 108 shows that thrust plate 12 is fixed to sleeve 5, thereby sealing a lower end of sleeve 5. Arm section 19 of sleeve 5 is placed on peripheral section 18 which does not face flange 11, so that an outer rim of disc-shaped flange 11 is surrounded by cylindrical sleeve 5. The locations of sleeve 5, flange 11 and shaft 8 are thus steadily fixed. Tip section 21 extending from arm 19 is caulked with rear (second) face 22 of thrust plate 12, and adhesive 27 is applied on second face 22 for sealing.

When the process of step 108 is completed, a second end of sleeve 5 is sealed, and a first end (rotor hub 50 being disposed on the first end side) remains open. This structure is thus called a "one-side sealed spindle motor".

Step 110 shows that a visual inspection and a sealing inspection are carried out. In the visual inspection, shapes and displacements of thrust plate 12 and sleeve 5 are inspected. Thrust plate 12 is utilized as a sealing member of the spindle motor. In the sealing inspection, air-tightness of these elements is tested, and an air-leak tester is preferably used.

Step 112 shows that lubricant is applied to the place where shaft 8 faces an upper end of sleeve 5. Simple composition oil disclosed in Japanese Patent Application Non-Examined Publication No. 2000-179552 can be used as the lubricant. Substances including magnetic fluid disclosed in Japanese Patent Application Non-Examined Publication No. H08-259982 can also be used as the lubricant.

Figure 4:
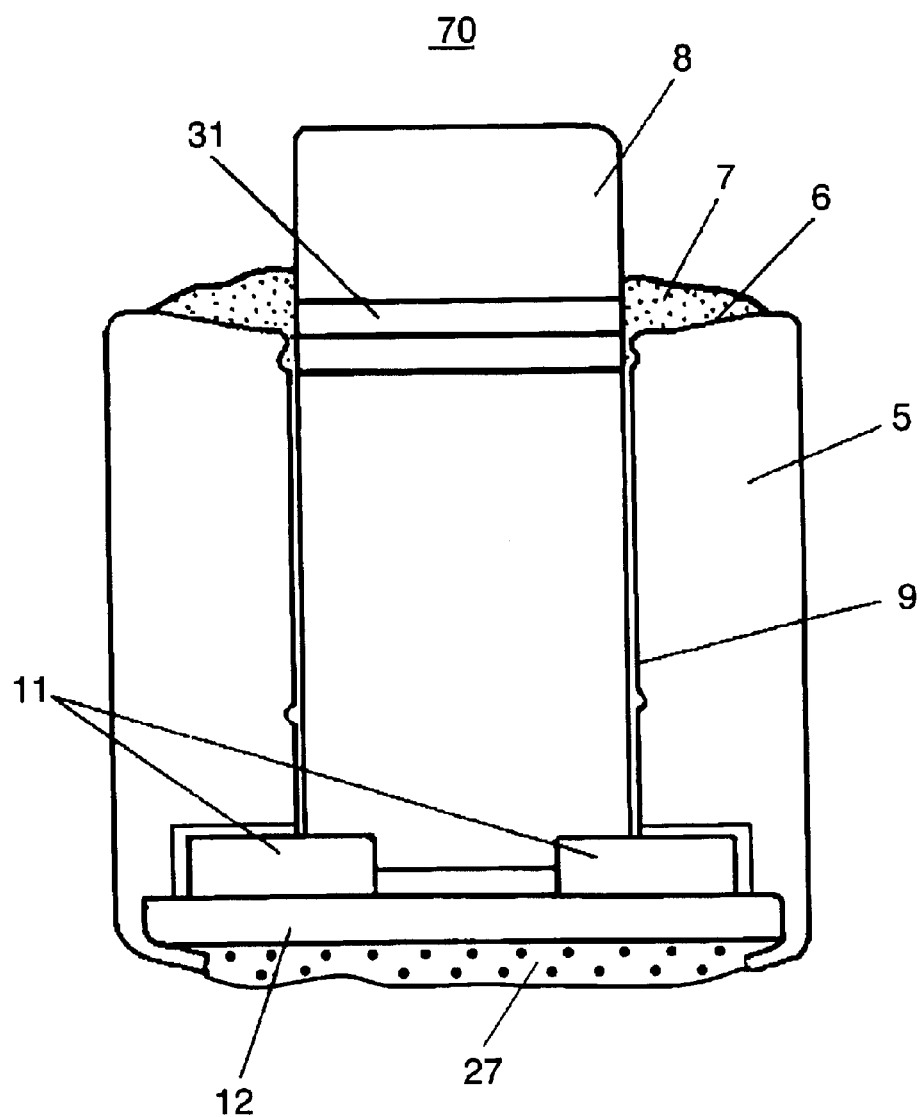
FIG. 4 shows a fluid bearing device of the spindle motor in accordance with the first exemplary embodiment.

FIG. 4 shows a status corresponding to step 112, i.e., the status in which fluid bearing device 70, which is a major part of spindle motor 1, is completed. FIG. 4 is detailed in embodiment 4 coming next. Step 114 shows that fluid bearing device 70, later shown in FIG. 4, is left in a vacuum atmosphere. In other words, shaft 8, sleeve 5, flange 11, thrust plate 12 and adhesive 27, which fixes tip section 21 of sleeve 5 to thrust plate 12, are exposed in the vacuum. Fluid bearing device 70 is still an intermediate product of the spindle motor, and yet, it is a major part of the motor. Fluid bearing device 70 is left for several minutes in, for example, a vacuum chamber having a degree of vacuum not more than 100 Torr.

Step 116 shows that fluid bearing device 70 left in the vacuum is restored to a normal condition. At this moment, a pressure difference occurs between the atmospheric pressure and the vacuum in the bearing spaces, so that the lubricant is filled into the bearing spaces.

Step 118 finally shows that rotor hub 50 is welded to an end of shaft 8 by a laser. Hub 50 includes shoulder 51 and arm 52, and is substantially shaped as a disc. A hole (not shown) is punched at a center of hub 50, and shaft 8 is fit into this hole.

Dint 53 is provided near to the center, where shaft 8 is fit, of shoulder 51. Dint 53 and shaft 8 are welded by a laser at a spot where both the elements contact each other, and laser welded section 54 is formed. The presence of dint 53 saves a margin for welding, so that, the spindle motor can be downsized. Dint 53 is also used as a recognizing section for defining the place to be welded, so that laser welded section 54 can be provided exactly at a predetermined place.

Rotor hub 50 is one of the largest members of spindle motor 1, and is integrated with shaft 8 so as to spin. However, hub 50 is fixed to shaft 8 by laser welding, so that rotor hub 50 has a longer service life, excellent shock resistance and excellent resistance against leakage.

FIG. 3 shows essential steps for completing spindle motor 1, although, those steps do not cover all the steps. For instance, a step of fitting sleeve 5 to base member 2, and a step of fixing stator-core 56 and attracting-plate 58 to base member 2 are needed for completing the spindle motor, but these steps are omitted from FIG. 3. A part of the assembly procedure can be changed, and another step can be added based on a design request.

The laser welding is not necessarily provided at all of the contacting sections between shaft 8 and flange 11, and between shaft 8 and rotor hub 50 (i.e., all the contacting faces of the members to shaft 8). The laser welding can be provided to at least the mates to these contacting sections, so that spindle motor 1 having a long life and excellent shock resistance can be obtained.

EMBODIMENT 4

FIG. 4 illustrates a fluid bearing device, which is a major part of the spindle motor in accordance with the first embodiment. In the assembling process illustrated in the flowchart of FIG. 3, when step 112 ends, fluid bearing device 70 shown in FIG. 4 is completed. Fluid bearing device 70 is distinguished from spindle motor 1, because sleeve 5 is not yet fit into base member 2, or rotor hub 50 is not yet fixed to an end of shaft 8 of device 70.

In fluid bearing device 70, a first face of flange 11 is fixed to a first end of shaft 8, and a second face of flange 11 closely faces a first face of thrust plate 12. A second face of thrust plate 12 is caulked with the tip section 21 of sleeve 5. Adhesive 27 is applied to a place where second face 22 of thrust plate 12 closely faces tip section 21, so that this place is fixed and sealed. Further, lubricant is applied to tapering section 6 and its vicinity, where sleeve 5 closely faces shaft 8. Fluid bearing device 70 discussed above is a major part of the spindle motor. Indeed, device 70 is an intermediate unit among the components constituting spindle motor 1, but this fluid bearing device 70 can be treated as one unitized component.

This unitized component provides a number of advantages. First, this unitized component, which incorporates a plurality of members, saves a complicated assembly process for spindle motor 1 and provides a simple assembling process. Second, the lubricant is not handled yet at this stage, so that equipment, instruments used for assembly and other machines around the assembly line are not contaminated. Third, since the unitized component can be handled with ease, an airtight inspection and a visual inspection of a shape or looseness of sleeve 5 and thrust plate 12 can be simply carried out.

Fluid bearing 70 does not always require tapering section 6 to be provided on sleeve 5. The fourth embodiment can adopt a method of fitting shaft 8 into sleeve 5 before the lubricant is applied to inner wall 9 of sleeve 5 instead of a method of fitting shaft 8 into sleeve 5 whose inner wall 9 is pre-applied with the lubricant. Therefore, according to this method, an amount of lubricant supposed to overflow when shaft 8 is inserted into sleeve 5 can be saved. If L-shaped taper 31 is provided axially on shaft 8, taper 31 works as a reservoir for lubricant 7 and smoothly supplies lubricant 7 to the bearing space.

Embodiments 1 through 4 clarify advantages of the spindle motor and the method of assembly of the present invention. The advantages are further summarized as follows:

The spindle motor of the present invention comprises a shaft and a disc-shaped flange which is brought into contact with a second end of the shaft. The contact place is welded by a laser. The flange used for producing dynamic pressure is thus fixed to the end of the shaft, so that another disc-shaped unit (i.e., a thrust plate) used for forming the thrust bearing together with the flange can be mounted with ease. As such, the spindle motor features an advantage of simplifying the structure and the assembling process.

In the spindle motor of the present invention, laser welding is provided as a contacting section between the shaft and a rotor hub which is fixed to an axial end of the shaft. This laser welding can fix the rotor hub to the shaft maintaining the accuracy, the assembled position and the vertical status of the shaft with respect to the hub. The vertical accuracy among the other components can also be well maintained, which minimizes whirling and results in less precession of the shaft structure. The shaft can thus prolong its service life. The laser welding does not require much space, and produces high bond-strength in a small space. The motor thus becomes sufficiently strong against shocks.

The spindle motor of the present invention has a non-flat section on a first axial end of the shaft and a disc-shaped flange respectively. Both of the non-flat sections are brought into contact with each other, and the contact faces are welded by laser. This laser welding of the non-flat sections further enhances the bond-strength. The non-flat section of the shaft can be either a projection or a recess. The non-flat section of the flange can be either a recess or a projection, and the flange can have a hollow section at or near its center. Since those non-flat sections provided on the shaft and the flange engage each other, they are firmly fixed to each other. The recess or the projection can easily define a region to be welded.

In the spindle motor of the present invention, a shaft is inserted into a hollow section of a disc-shaped flange by an interference fitting method. This method maintains the position and vertical status of the flange with respect to the shaft by an accurate press-fit, and laser welding is provided to maintain the accuracy. As a result, the shaft structure obtains an extremely high accuracy, and the motor has a longer-life shaft. Further, the interference fit section is melted by laser, so that the stress produced by the interference fitting can be relaxed. Distortion produced in the flange is thus eliminated, and the flange is mounted to the shaft with a of form as accurate as that of when the flange was processed into a disc. As a result, the motor has a longer-life shaft.

The interference at the insertion depends on a thickness of the flange, but it is approximately not more than approximately 20 $\mu$m, and preferably not more than 1 $\mu$m. This range of interference allows the assembled positional accuracy of the flange with respect to the shaft to be stable, and if the interference is kept within this range, no changes in position and slant occur when the laser welding is carried out. Also this range can prevent the distortion of the flange from being too excessive to be eliminated by the structure discussed above.

In the spindle motor of the present invention, the contact faces between the shaft and the disc-shaped flange are welded by laser at least at two points symmetrically positioned along a rotating direction with respect to the center axis of the shaft. When multi-points are welded, the laser is irradiated at those points sequentially along the rotating direction.

As such, a plurality of points to be heated and melted are arranged symmetrically with respect to the rotating direction. This preparation allows the stress due to heating/cooling to work evenly in a circumferential direction. Thus the flange is welded to the shaft without being slanted, and the shaft life is prolonged.

The laser welding is carried out sequentially along the rotating direction. This method differs from the spot-welding method because a point immediately before the point being welded is always pre-heated. Therefore, the member is welded without receiving heat/cool cycles repeated in numbers. The member is also welded along a moderate heat/cool curve. The stress due to heating and cooling is minimized, and the whirling or warping of the flange is also restrained. As a result, the shaft life can be prolonged.

In the spindle motor of the present invention, a side of the projection of the shaft is fit to the side wall of the hollow section provided at or near the center of the flange. The shoulder of the projection closely faces another face of the flange. The side and the shoulder of the projection are welded with the flange by laser. In other words, the laser welding is provided at the overall contact face and the faces closely opposite to each other between the projection of the shaft and the flange. This structure increases the shock resistance of the motor.

A method of assembling the spindle motor of the present invention includes: inserting a side of an axial end of a shaft into a hollow section formed at or near the center of a first disc-shaped unit, namely a flange, but halting the insertion on the way through the hollow section so that a part of the hollow section remains as a recess; and welding the contact faces by irradiating a laser beam from the hollow section side between the side of the shaft and the side wall of the hollow section.

As such, the laser welding is provided at the side wall of the hollow section of the flange. This structure reduces melting/hardening shrinkage stress occurring in the flange within the thickness of the flange. Thus, a bending moment due to the shrinkage stress produced by melting/hardening becomes too little to deform the flange into a dish-shape. The flange maintains its flatness and vertical status, and saves a step of grinding the flange for correction. As a result, a simple assembling process is obtainable.

The hollow section is not stuffed up (filled) completely, and leaves some portion as a recess. This recess is utilized for adjusting a height of the motor or a direction, or absorbing dispersion of the shaft length. A laser welded section is provided at the hollow section, so that a margin for the welding is not needed. The hollow section is also utilized for defining a region to be welded, so that quicker and more accurate assembly can be expected.

Another method of assembling the spindle motor of the present invention includes: fitting a side of a projection formed on an axial end of the shaft to a side wall of a hollow section formed at or near the center of a first disc-shaped unit, namely, a flange; facing a shoulder of the projection closely to a face of the flange; and welding the fitted faces and the faces closely opposite to each other by laser. According to this method, almost all the fitted face and the faces being closely opposite to each other between the projection and the flange are welded by laser, which enhances the fixing strength between the shaft and the flange. As a result, the shock resistance of the motor is improved.

Still another method of assembling the spindle motor of the present invention includes: welding a flange (a first disc-shaped unit) to a shaft by a laser to fix them to each other, then facing a face of a thrust plate (a second disc-shaped flange) closely to a face of the flange; and fixing another face of the thrust plate to an end of a sleeve. According to this method, the faces of the flange and the thrust plate closely facing each other form a thrust bearing. Thus a larger dynamic pressure, which bears an axial load of the shaft, can be obtained. Further, since the thrust plate and the sleeve are fixed to each other, the mechanical strength of the spindle motor can be enhanced.

Another method of assembling the spindle motor includes at least one of the laser welded section or a first disc-shaped unit (flange) being ground during or after the welding. According to this method, if the welding damages a part of a member, the damaged part can be repaired, and the whirling of the flange with respect to the shaft can be corrected. The shaft life can thus be prolonged.

Still another method of assembling the spindle motor of the present invention includes: fixing a disc-shaped flange to a part of a shaft, the flange having a greater diameter than that of the shaft; inserting the shaft into a sleeve in which both ends are open; facing a face of the flange closely to a face of a thrust plate; and sealing the end of the sleeve, from the end the shaft is inserted, with another face of the thrust plate, thereby making the end of the sleeve airtight. According to this method, the faces of the flange and the thrust plate closely facing each other can form a thrust bearing. Thus a larger dynamic pressure, which bears an axial load of the shaft, can be obtained. Further, since the thrust plate and the flange are fixed to each other, the mechanical strength of the spindle motor can be enhanced. Further, since both ends of the sleeve are open, the shaft with the flange can be inserted into the sleeve with ease even after the disc-shaped flange is mounted to the shaft.

Still another method of assembling the spindle motor of the present invention includes: mounting an outer wall of the cylindrical sleeve of the unitized component to a base member; and mounting a rotor hub to the second end of the shaft. The unitized component is a fluid bearing device (i.e., a major component of the spindle motor) so that this unitized component is preferably prepared in advance. Then the fluid bearing device is mounted to the base member, and the rotor hub is mounted to the fluid bearing device. This method thus simplifies the complicated assembly work of the spindle motor, and saves labor.

Another method of assembling the spindle motor of the present invention features that at least one of a fixed section between the shaft and the flange or a fixed section between the shaft and the rotor hub is welded by a laser. As such, at least one of the members fixed to the shaft and rotating together with the shaft is fixed by laser welding, so that the bond-strength and accuracy of assembly are increased. As a result, the spindle motor having a longer service-life of the shaft and enhanced shock resistance is obtainable.

What is claimed is:

1. A spindle motor comprising:
   a shaft having a large-diameter first section at a first end, and having a small-diameter second section at a second end so as to form a shoulder between said first section and said second section;

a disc-shaped flange having a central opening, a first face, and a second face, said second section of said shaft being fitted into said central opening of said flange so as to form a reservoir between said shoulder of said shaft and said second face of said flange, said flange being fixed to said second section at said second end of said shaft, and having an outside diameter larger than an outside diameter of said first section of said shaft;

a cylindrical sleeve, said shaft being inserted into said sleeve;

a radial bearing space formed between an outer circumferential surface of said shaft and an inner circumferential surface of said sleeve;

a rotor hub opposite a first end of said sleeve and fixed to said first end of said shaft;

a thrust plate having a first face facing said first face of said flange so as to form a thrust bearing space between said first face of said flange and said first face of said thrust plate; and lubricant retained in said thrust bearing space.

2. The spindle motor of claim 1, wherein a height of said second section is less than or equal to a thickness of said flange.

3. The spindle motor of claim 1, wherein a second axial face of said shaft at said second end of said shaft is not flush with said first face of said flange so as to form a recess at a center of said flange such that a distance between said second axial face of said shaft in said recess is greater than a distance between said first face of said flange and said first face of said thrust plate.

4. The spindle motor of claim 1, wherein said flange is laser-welded to said second section of said shaft.

5. The spindle motor of claim 4, wherein said second section of said shaft and said central opening of said flange have an interference fit.

6. The spindle motor of claim 4, wherein said second section of said shaft is connected to said flange by at least two laser welds symmetrically spaced apart in a circumferential direction of said shaft.

7. The spindle motor of claim 1, wherein said rotor hub is laser-welded to said first end of said shaft.

8. The spindle motor of claim 7, wherein said second section of said shaft and said central opening of said flange have an interference fit.

9. The spindle motor of claim 7, wherein said second section of said shaft is connected to said flange by at least two laser welds symmetrically spaced apart in a circumferential direction of said shaft.

10. The spindle motor of claim 1, wherein said second section of said shaft and said central opening of said flange have an interference fit.

11. The spindle motor of claim 10, wherein said second section of said shaft is connected to said flange by at least two laser welds symmetrically spaced apart in a circumferential direction of said shaft.

12. The spindle motor of claim 10, wherein said central opening of said flange comprises a through-hole, an outer circumferential surface of said second section of said shaft contacts a circumferential surface of said through-hole, said second section of said shaft being laser-welded to said flange.

13. The spindle motor of claim 1, wherein said second section of said shaft is connected to said flange by at least two laser welds symmetrically spaced apart in a circumferential direction of said shaft.

14. The spindle motor of claim 13, wherein said central opening of said flange comprises a through-hole, an outer circumferential surface of said second section of said shaft contacts a circumferential surface of said through-hole, said second section of said shaft being laser-welded to said flange.

15. A spindle motor comprising:

a shaft having a first end, a second end, a main portion, and an axial projection extending from said main portion at said second end of said shaft so as to form a shoulder between said main portion and said projection;

a disc-shaped flange having a central opening, a first face, and a second face, said projection of said shaft being fitted into said central opening of said flange so that a sidewall of said projection contacts a sidewall of said central opening and so as to form a reservoir between said shoulder of said shaft and said second face of said flange, said flange being fixed to said projection at said second end of said shaft, and having an outside diameter larger than an outside diameter of said main portion of said shaft;

a cylindrical sleeve, said shaft being inserted in said sleeve;

a radial bearing space formed between an outer circumferential surface of said main portion of said shaft and an inner circumferential surface of said sleeve;

a rotor hub opposite a first end of said sleeve and fixed to said first end of said shaft;

a thrust plate having a first face facing said first face of said flange so as to form a thrust bearing space between said first face of said flange and said first face of said thrust plate; and lubricant retained in said thrust bearing space.

16. The spindle motor of claim 15, wherein said projection has a circular cross-section, and has a smaller diameter than said main portion.

17. The spindle motor of claim 15, wherein a height of said projection is less than or equal to a thickness of said flange.

18. The spindle motor of claim 15, wherein said central opening of said flange comprises a through-hole, said projection of said shaft being laser-welded to said flange.

19. The spindle motor of claim 15, wherein said projection of said shaft and said central opening of said flange have an interference fit.

20. The spindle motor of claim 15, wherein said projection of said shaft is connected to said flange by at least two laser welds symmetrically spaced apart in a circumferential direction of said shaft.

* * * * *